US012672059B2

(12) United States Patent
Luthra et al.

(10) Patent No.:  US 12,672,059 B2
(45) Date of Patent:  Jun. 30, 2026

(54) SYSTEM AND METHOD FOR O-CLOUD NODE SHUTDOWN IN IDLE TIMES TO SAVE ENERGY CONSUMPTION

(71) Applicant: RAKUTEN MOBILE, INC., Tokyo (JP)

(72) Inventors: Mohit Luthra, Singapore (SG); Pankaj Shete, Tokyo (JP); Awn Muhammad, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 581 days.

(21) Appl. No.: 18/012,442

(22) PCT Filed: Nov. 10, 2022

(86) PCT No.: PCT/US2022/049482
§ 371 (c)(1),
(2) Date: Dec. 22, 2022

(87) PCT Pub. No.: WO2023/204850
PCT Pub. Date: Oct. 26, 2023

(65) Prior Publication Data
US 2024/0107442 A1    Mar. 28, 2024

(30) Foreign Application Priority Data

Apr. 22, 2022    (SG) .......................... 10202204268W

(51) Int. Cl.
*H04W 52/02*       (2009.01)
*H04L 41/052*      (2022.01)
*H04L 41/0803*     (2022.01)

(52) U.S. Cl.
CPC ............................... *H04W 52/0203* (2013.01)

(58) Field of Classification Search
CPC .. H04W 52/02; H04W 52/0203; H04W 52/00
See application file for complete search history.

(56) References Cited

U.S. PATENT DOCUMENTS

| | | | | |
|---|---|---|---|---|
| 2014/0192773 | A1* | 7/2014 | Austrell .............. | H04L 65/1073 370/331 |
| 2021/0258866 | A1* | 8/2021 | Chou .................... | H04W 48/16 |
| 2022/0094751 | A1* | 3/2022 | Szczesniak ......... | H04L 67/1036 |

OTHER PUBLICATIONS

International Search Report dated Mar. 10, 2023 in International Application No. PCT/US22/49482.
(Continued)

*Primary Examiner* — Jinsong Hu
*Assistant Examiner* — Farideh Madani
(74) *Attorney, Agent, or Firm* — Sughrue Mion, PLLC

(57)                ABSTRACT
A method and system for shutting down an Open Radio Access Network (O-RAN) Cloud (O-Cloud) node are provided. The method includes: receiving, by a FOCOM, a first request to drain an O-Cloud node, the first request being received from a user terminal or from a Non-Real-Time (Non-RT) RAN Intelligent Controller (RIC) based on analysis of O2 telemetry data; transmitting, by the FOCOM to an IMS via an O2 interface, a second request to drain the O-Cloud node based on the received first request; receiving, by the FOCOM, a third request to shut down the drained O-Cloud node, the third request being received from the user terminal or from the Non-RT RIC; transmitting, by the FOCOM to the IMS, a fourth request to shut down the O-Cloud node based on the received third request; and receiving, from the IMS, a notification that the O-Cloud node has been shut down.

22 Claims, 6 Drawing Sheets

(56)            References Cited

OTHER PUBLICATIONS

Written Opinion dated Mar. 10, 2023 in International Application
No. PCT/US22/49482.
"O-RAN.WG6.O-Cloud Energy Savings.v01.00", O-RAN Alli-
ance, 2022, pp. 1-29 (29 pages).

* cited by examiner

FIG. 2

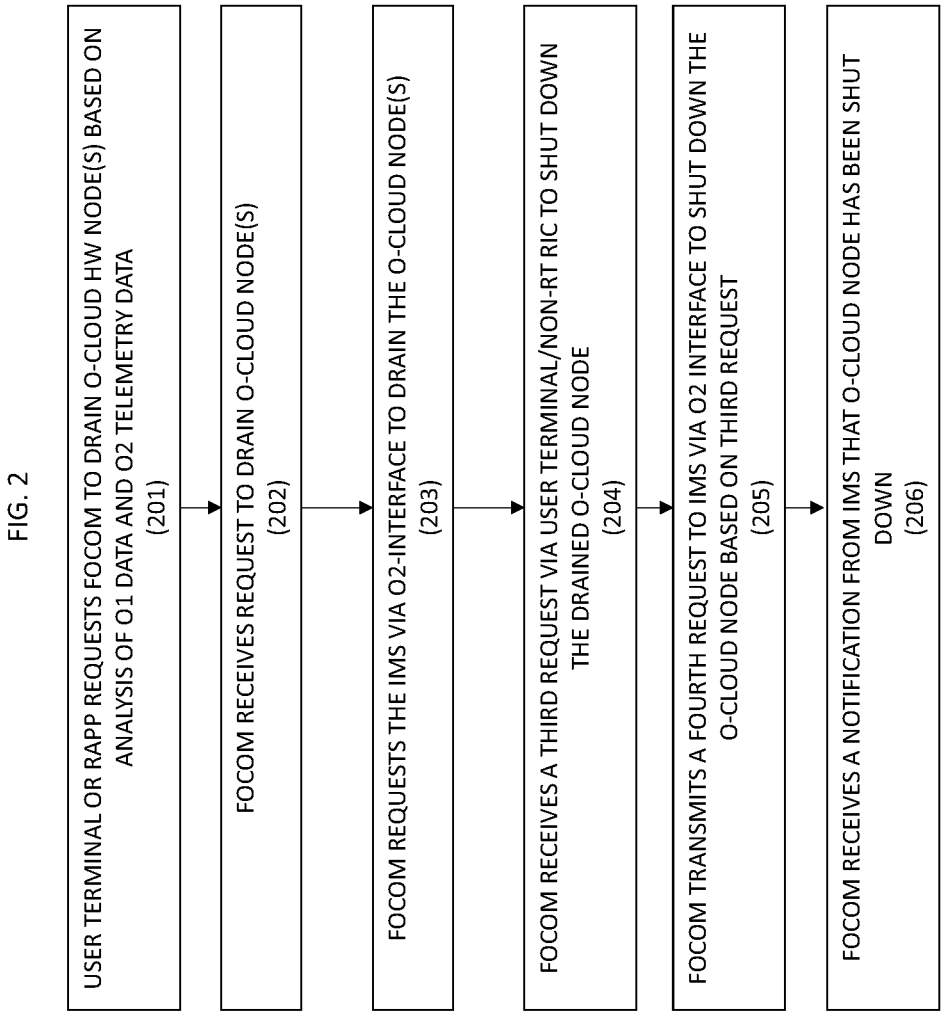

USER TERMINAL OR RAPP REQUESTS FOCOM TO DRAIN O-CLOUD HW NODE(S) BASED ON ANALYSIS OF O1 DATA AND O2 TELEMETRY DATA
(201)

FOCOM RECEIVES REQUEST TO DRAIN O-CLOUD NODE(S)
(202)

FOCOM REQUESTS THE IMS VIA O2-INTERFACE TO DRAIN THE O-CLOUD NODE(S)
(203)

FOCOM RECEIVES A THIRD REQUEST VIA USER TERMINAL/NON-RT RIC TO SHUT DOWN THE DRAINED O-CLOUD NODE
(204)

FOCOM TRANSMITS A FOURTH REQUEST TO IMS VIA O2 INTERFACE TO SHUT DOWN THE O-CLOUD NODE BASED ON THIRD REQUEST
(205)

FOCOM RECEIVES A NOTIFICATION FROM IMS THAT O-CLOUD NODE HAS BEEN SHUT DOWN
(206)

SYSTEM AND METHOD FOR O-CLOUD NODE SHUTDOWN IN IDLE TIMES TO SAVE ENERGY CONSUMPTION

CROSS-REFERENCE TO RELATED APPLICATION(S)

This application is a National Stage of International Application No. PCT/US2022/049482 filed Nov. 10, 2022, claiming priority based on Singapore Provisional Patent application Ser. No. 10202204268W, filed at the Singaporean Patent Office on Apr. 22, 2022, the disclosure of which is incorporated by reference herein in its entirety.

FIELD

System and methods consistent with example embodiments of the present disclosure relate to draining and shutting down an open radio access network (O-RAN) cloud (O-Cloud) node in idle times to save energy consumption.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N in FIG. 1), and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RA centralized Unit (O-CU), O-RAN Distributed Unit (O-DU), etc.).

The Near-RT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The Near-RT RIC uses the E2 interface to control the underlying RAN elements (E2 nodes/network functions (NFs)) over a near-real-time control loop. The Near-RT RIC monitors, suspends/stops, overrides, and controls the E2 nodes (O-CU, O-DU, and O-eNB) via policies. For example, the Near-RT sets policy parameters on activated functions of the E2 nodes. Further, the Near-RT RIC hosts xApps to implement functions such as quality of service (QoS) optimization, mobility optimization, slicing optimization, interference mitigation, load balancing, security, etc. The two types of RICs work together to optimize the O-RAN. For example, the Non-RT RIC provides, over the A1 interface, the policies, data, and AI/ML models enforced and used by the Near-RT RIC for RAN optimization, and the Near-RT returns policy feedback (i.e., how the policy set by the NON-RT RIC works).

The SMO framework, within which the Non-RT RIC is located, manages and orchestrates RAN elements. Specifically, the SMO includes the Federated O-Cloud Orchestration and Management (FOCOM), a Network Function Orchestrator (NFO) that manages Virtual Machines (VM) based Virtual Network Functions (VNF) and container (i.e., instance) based VNF, and the OAM as a part of the SMO that manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides Infrastructure Management Services (IMS) and Deployment Management Services (DMS). The O2 interface may also send O2 telemetry data to the SMO, e.g., O-cloud configuration or any logical function data, energy consumption, health status of node, etc.

E2 nodes (i.e., virtualized/containerized instantiations of network functions) are deployed (i.e., hosted) on the O-Cloud infrastructure (i.e., one or more O-Cloud nodes). However, when there are only a few network functions deployed on an O-Cloud or during idle times, these network functions may be deployed across multiple nodes and multiple underutilized nodes may be in a normal or full power state, thereby consuming a relatively large amount of energy.

SUMMARY

According to embodiments, systems and methods are provided for draining and shutting down one or more O-Cloud nodes within an O-Cloud infrastructure of a telecommunications network, wherein the draining of one or more O-Cloud nodes is based on determining and analyzing the performance of at least one O-Cloud node or at least one virtual network function hosted thereon. The systems and methods, upon receiving a request to drain at least one O-Cloud node, provide for processing the drain request within the SMO and to request the IMS to control the implementation of the draining request, wherein the IMS controls the O-Cloud infrastructure to drain the at least one O-Cloud node and reports the status of the drained O-Cloud node to the SMO. Subsequently, the drained at least one O-Cloud node can be shut down to thereby conserve energy. The monitoring and analyzing of the O2 telemetry data of the O-Cloud infrastructure has the advantage that an O-Cloud node can be drained and shut down in an idle time to provide a more energy efficient functioning of the O-RAN.

According to an embodiment, a method of shutting down an Open Radio Access Network (O-RAN) Cloud (O-Cloud) node includes: receiving, by a FOCOM (Federated O-Cloud Orchestration and Management), a first request to drain an O-Cloud node, the first request being received from a user terminal or from a Non-Real-Time (Non-RT) RAN Intelligent Controller (RIC) based on analysis of O2 telemetry data; transmitting, by the FOCOM to an Infrastructure Management Services (IMS) via an O2 interface, a second request to drain the O-Cloud node based on the received first request; receiving, by the FOCOM, a third request to shut down the drained O-Cloud node, the third request being received from the user terminal or from the Non-RT RIC; transmitting, by the FOCOM to the IMS via the O2 interface, a fourth request to shut down the O-Cloud node based on the received third request; and receiving, from the IMS, a notification that the O-Cloud node has been shut down.

According to an embodiment, a system for shutting down an Open Radio Access Network (O-RAN) Cloud (O-Cloud) node, includes: at least one first memory storing first instructions; and at least one processor implementing a FOCOM, the at least one processor configured to execute the stored first instructions to: receive a first request to drain an O-Cloud node, the first request being received from a user terminal or from a Non-Real-Time (Non-RT) RAN Intelligent Controller (RIC) based on analysis of O2 telemetry data; transmit, to an Infrastructure Management Services (IMS) via an O2 interface, a second request to drain the O-Cloud node based on the received first request; receive a third request to shut down the drained O-Cloud node, the third request being received from the user terminal or from the Non-RT RIC; transmit, to the IMS via the O2 interface, a fourth request to shut down the O-Cloud node based on the received third request; and receive, from the IMS, a notification that the O-Cloud node has been shut down.

According to an embodiment, at least one non-transitory computer-readable recording medium has recorded thereon instructions executable by at least one processor to perform a method, for shutting down an Open Radio Access Network (O-RAN) Cloud (O-Cloud) node, the method including: receiving, by a FOCOM (Federated O-Cloud Orchestration and Management), a first request to drain an O-Cloud node, the first request being received from a user terminal or from a Non-Real-Time (Non-RT) RAN Intelligent Controller (RIC) based on analysis of O2 telemetry data; transmitting, by the FOCOM to an Infrastructure Management Services (IMS) via an O2 interface, a second request to drain the O-Cloud node based on the received first request; receiving, by the FOCOM, a third request to shut down the drained O-Cloud node, the third request being received from the user terminal or from the Non-RT RIC; transmitting, by the FOCOM to the IMS via the O2 interface, a fourth request to shut down the O-Cloud node based on the received third request; and receiving, from the IMS, a notification that the O-Cloud node has been shut down.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 2 is a flowchart of a method for draining and shutting down an O-Cloud node using an O2 interface between the FOCOM and the O-Cloud according to an embodiment;

DETAILED DESCRIPTION

Figure 1:
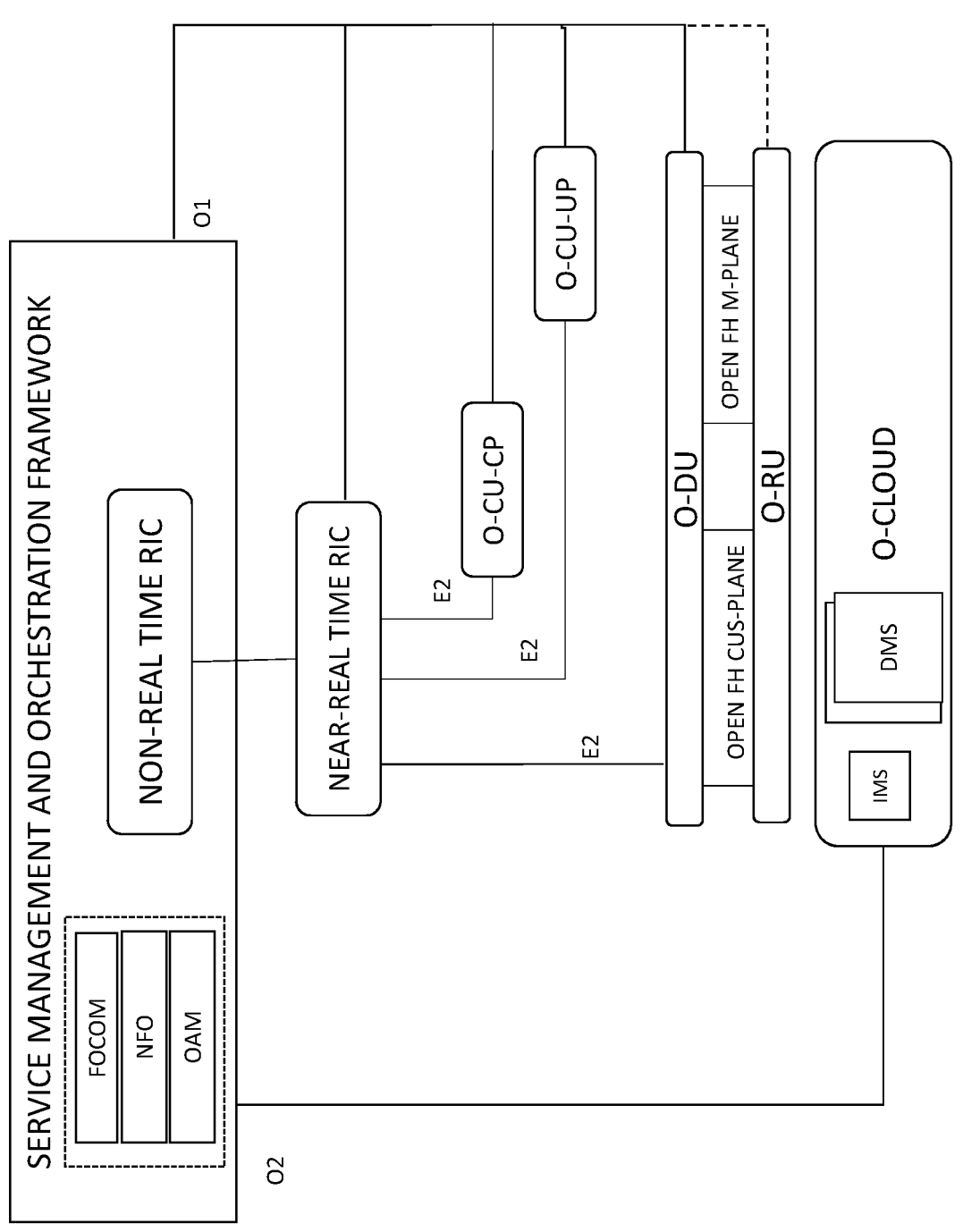
FIG. 1 illustrates an O-RAN architecture according to the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include,"

"including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system for draining and shutting down of O-cloud node in idle times to save energy consumption. Particularly, when there are only few Network Functions that are deployed on an O-Cloud, the Network Function placement is optimized on the O-Cloud to limited O-Cloud nodes and rest of the O-cloud nodes may be shut down and relocated to save energy consumption in O-Cloud node idle times.

FIG. 2 is a flowchart of a method for draining and shutting down an O-Cloud node using an O2 interface between the FOCOM and the O-Cloud according to an embodiment. The method of FIG. 2 (at least operations 202 through 206) are performed by the FOCOM.

Referring to FIG. 2, the draining and shutting down of O-Cloud Node(s) may be initiated at 201 by either a user via a user terminal (e.g., including an application for managing network functions and/or subscribed to receive alarm events, notifications, etc., from the SMO) or by one or more rApps of the Non-RT RIC within the SMO. Components of the O-RAN architecture in FIGS. 2, 3 and 4 are similar to those according to FIG. 1.

Figure 3:
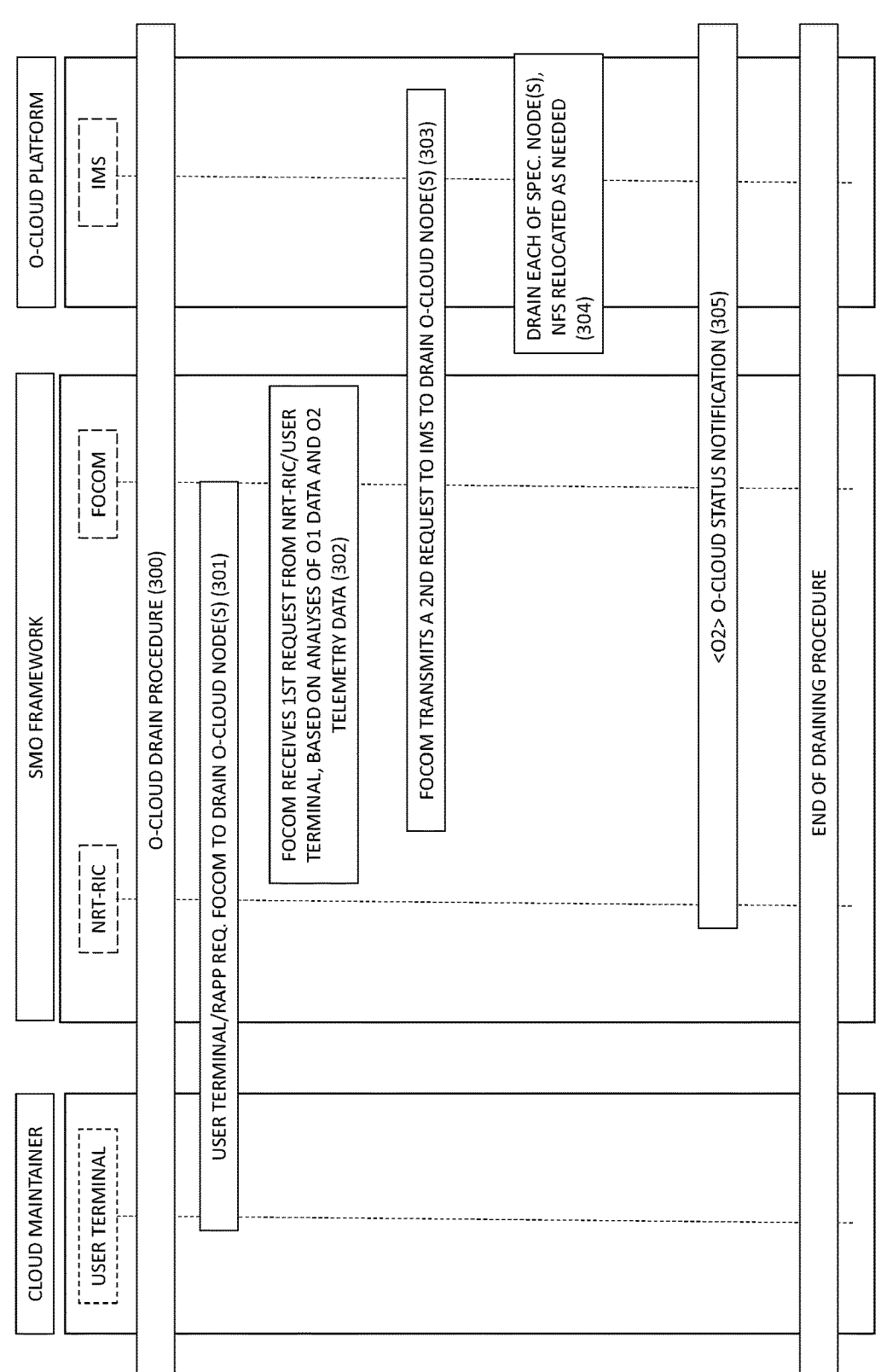
FIG. 3 is a diagram of an example environment in which systems described herein may be implemented for draining and shutting down of an O-Cloud node according to an embodiment.
Figure 4:
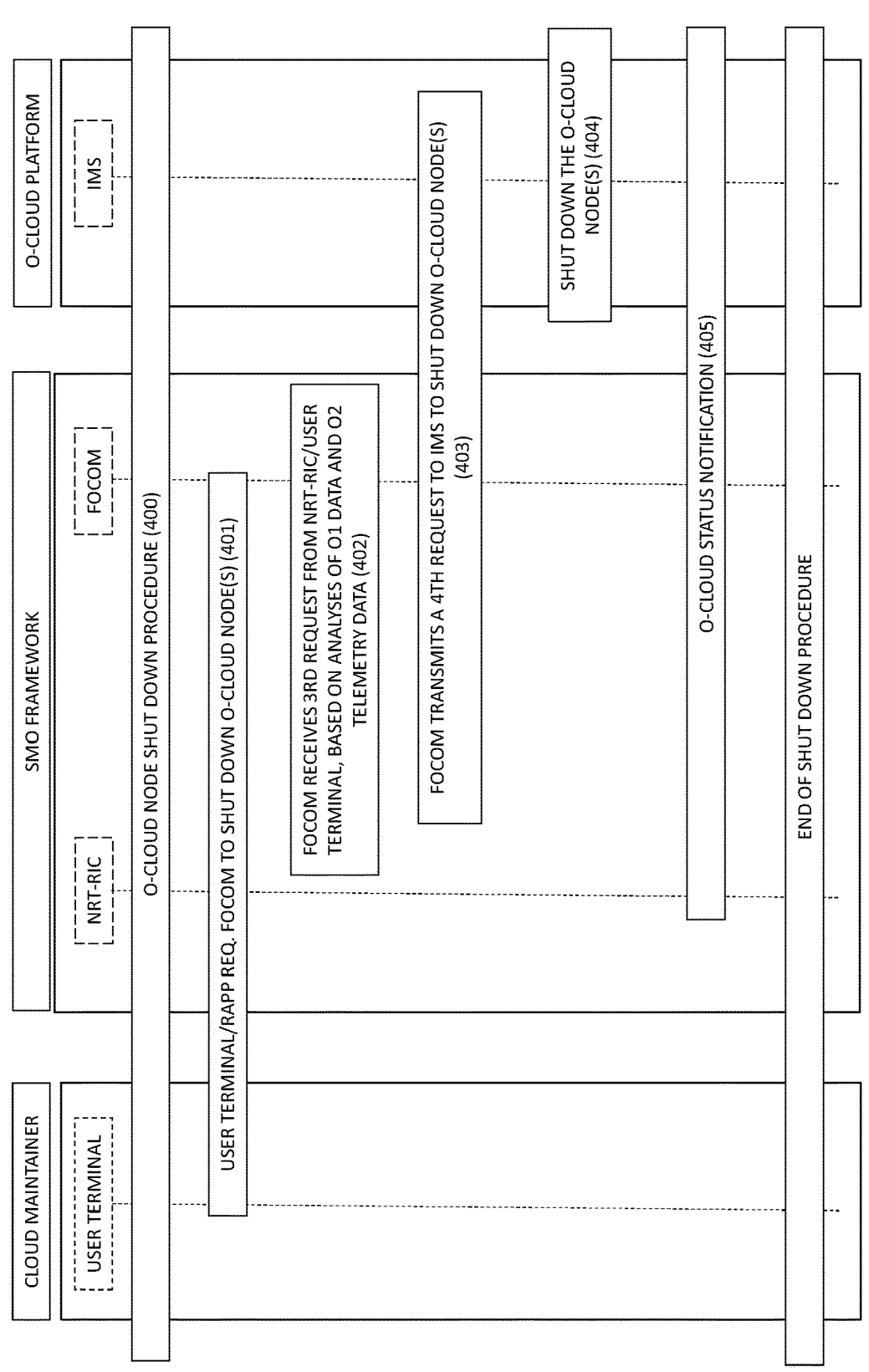
FIG. 4 is a diagram of an example environment in which systems described herein may be implemented for a draining procedure of an O-Cloud node according to an embodiment.

Prior to the commencement of draining and shutting down of O-cloud node(s) as illustrated in FIGS. 2, 3 and 4, the availability of the SMO and the availability of the O-Cloud are assumed. Further, the Non-RT RIC or the above-mentioned user terminal are configured to be subscribed to receive notifications from the SMO and to receive O2-IMS alarm event notifications. Accordingly, the Non-RT RIC and/or the user terminal (e.g., the application installed in the user terminal) can receive and analyse O2 telemetry data to determine O-Cloud nodes for hardware draining and hardware shut down.

According to an embodiment, the determination to drain and then shut down an O-Cloud node may be based on O2 data (or O2 telemetry data) received over the O2 interface, such as O-Cloud configuration information (e.g., single node or cluster, number of microservices or network functions running on each node, etc.), energy consumption (e.g., CPU load, power consumption, etc.), hardware usage (e.g., memory usage), etc. According to another embodiment, the determination to drain and then shut down an O-Cloud node may be based on both the O2 data and O1 data (or O1 telemetry data) received over the O1 interface, such as traffic data (or traffic pattern data), physical resource block (PRB) usage, number of users, etc. For example, the determination may be based on a prediction of a number of microservices or network functions needed over a subsequent predetermined period (e.g., for the next hour) and may generate a policy accordingly. At operation 201, a user (via an application running on a user terminal), the application in the user terminal, or an rApp in the Non-RT RIC determines and requests to drain one or more O-Cloud nodes based on (e.g., based on an analysis of) the received O2 and/or O1 data. The request (or service request) is sent from the user terminal or the Non-RT RIC to the FOCOM, and includes an identifier of each O-Cloud node to be drained.

At operation 202, the FOCOM receives the request (first request) to drain the one or more O-Cloud nodes, and at operation 203 the FOCOM requests (second request) the IMS to drain the one or more O-Cloud nodes based on the received first request. Here, the FOCOM may request the IMS to drain the one or more O-Cloud nodes via the O2 interface, e.g., using O2ims services. Operation 203 may be looped or repeatedly performed for each of the one or more O-Cloud nodes identified in the first request. Further, the FOCOM may determine an order for draining the one or more O-Cloud nodes according to a predetermined criterion or randomly, and may transmit the second requests respectively corresponding to the one or more O-Cloud nodes in accordance with this determined order. The FOCOM may then receive a status update notification from the IMS indicating a status of the drain request(s), e.g., indicating that the draining is completed. Here, the user terminal (i.e., application installed therein) and/or the Non-RT RIC (i.e., rApp) may also receive the status update notification.

At operation 204, the FOCOM receives a request (third request) from the user terminal or the Non-RT RIC (i.e., the rApp) to shut down the drained one or more O-Cloud nodes, and at operation 205 the FOCOM requests (fourth request) the IMS to shut down the one or more O-Cloud nodes based on the received third request. The third request may include identifiers of the one or more O-Cloud nodes to be shut down. Operation 205 may be looped or repeatedly performed for each of the one or more O-Cloud nodes to be shut down. Further, the FOCOM may determine an order for shutting down the one or more O-Cloud nodes according to a predetermined criterion or randomly, and may transmit the fourth requests respectively corresponding to the one or more O-Cloud nodes in accordance with this determined order.

At operation 206, the FOCOM receives a notification from the IMS that the one or more O-Cloud nodes have been shut down. Here, the user terminal (i.e., application installed therein) and/or the Non-RT RIC (i.e., rApp) may also receive the notification.

FIG. 3 illustrates a detailed method for implementing a draining procedure of O-Cloud node(s) according to an embodiment. The method of FIG. 3 is performed by a user terminal (i.e., application installed therein) and/or Non-RT RIC (rApp), as well as a FOCOM and WIS.

Referring to FIG. 3, the method for implementing a draining procedure 300 of an O-Cloud node may be triggered by or based on input from the O2 interface (e.g., O2 telemetry data). According to another embodiment, the method may consider both O2 telemetry data received over the O2 interface and O1 telemetry data received over the O1 interface.

A user, the above-mentioned application installed in the user terminal, or the Non-RT RIC (rApp) analyzes the received O2 telemetry data and/or O1 telemetry data, and determines whether to drain and shut down an O-Cloud node based thereon. For example, telemetry data indicative of an idle state or a low number of instantiated network functions may be determined as a basis for draining and shutting down an O-Cloud node(s). In an example embodiment, the analysis may include a comparison between at least one key performance indicator (KPI) relating to the performance of at least O-Cloud node and a corresponding threshold. Based on the comparison, the user terminal or Non-RT RIC (e.g., one or more rApps of the Non-RT RIC) determines whether to drain and shut down an O-Cloud node(s).

In operation 301, the user terminal or Non-RT RIC sends a first request to the FOCOM to drain the O-Cloud node(s) determined to be shut down, as described above. The first request may include an identifier of the O-Cloud node(s).

In operation 302, the FOCOM receives the first request from the Non-RT RIC or user terminal to drain the O-Cloud node(s).

In operation 303, the FOCOM via the O2 interface sends a second request to the IMS to drain the O-Cloud node(s) based on the received first request.

In operation 304, the IMS drains each specified node. To this end the IMS may determine whether any network functions (NFs) deployed on a particular O-Cloud node to be drained and shut down should be redeployed on another node, or can simply be terminated without relocating. If the NF is still needed, the IMS controls to relocate the NF on another O-Cloud node that is not to be shut down, and informs the FOCOM, Non-RT RIC, and/or user terminal (application) of the relocation.

In operation 305, in an example embodiment, the IMS sends a confirmation notification of the completed draining procedure to the FOCOM via the O2 interface. The IMS may also (or alternatively) send the notification to the Non-RT RIC (rApp) and/or the user terminal (application), for example, based on whether they are subscribed to notifications from the IMS.

FIG. 4. illustrates a detailed method for implementing a shutting down procedure 400 of O-Cloud node(s) according to an embodiment. The method of FIG. 4 is performed by a user terminal (i.e., application installed therein) and/or Non-RT RIC (rApp), as well as a FOCOM and WIS.

Referring to FIG. 4, in operation 401, user terminal (application) or Non-RT RIC (rApp) requests (third request) FOCOM to shut down O-Cloud node(s).

In operation 402, FOCOM receives the third request to shut down O-cloud node(s). The request may be sent via the O2 interface.

In operation 403, the FOCOM transmits a fourth request to the IMS to shut down the specified O-Cloud node(s).

In operation 404, the IMS shuts down the specified O-Cloud node(s) based on the fourth request. Here, the O-Cloud nodes had been previously drained per the method of FIG. 3.

In operation 405, the IMS sends a confirmation notification of the completed shutdown procedure to the FOCOM via the O2 interface. The IMS may also (or alternatively) send the notification to the Non-RT RIC (rApp) and/or the user terminal (application), for example, based on whether they are subscribed to notifications from the IMS.

Figure 5:
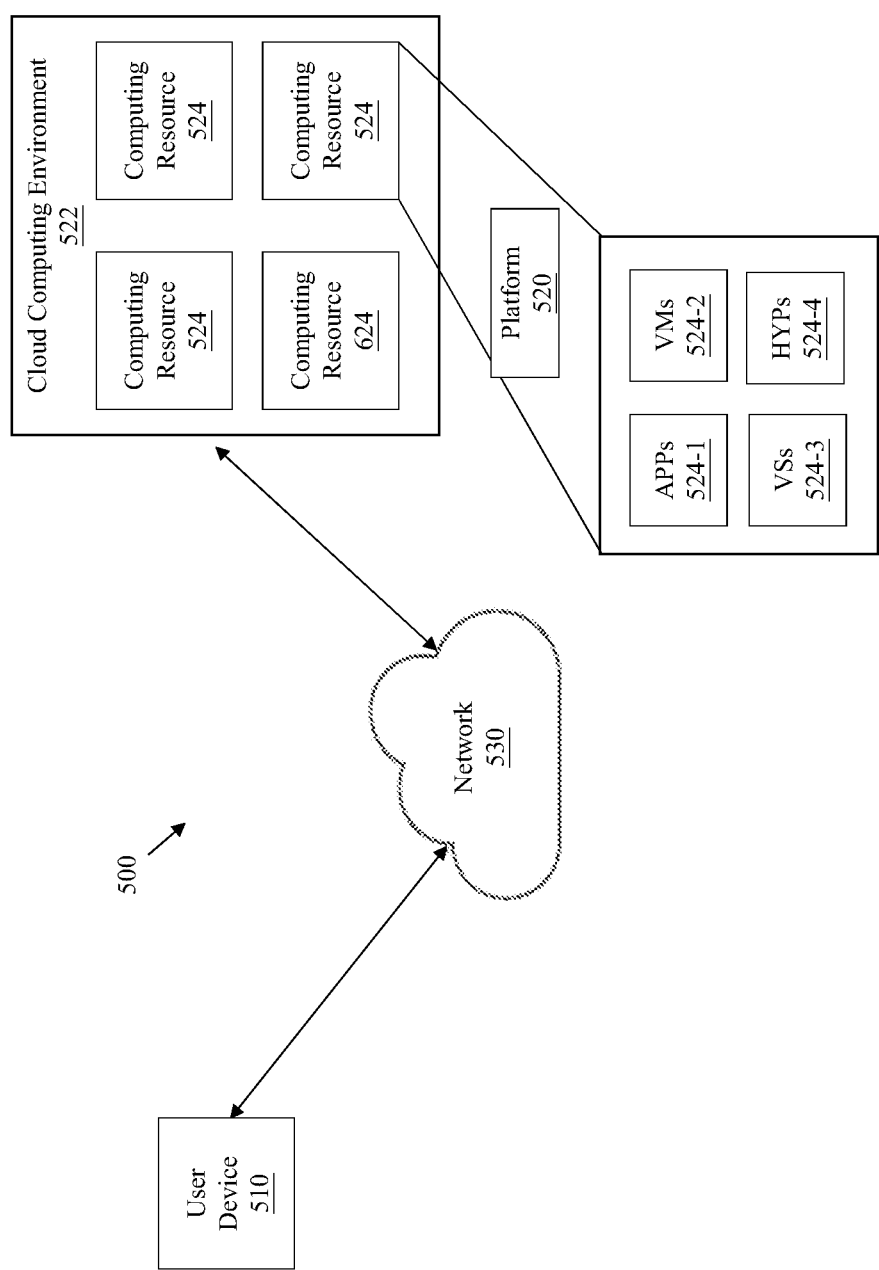
FIG. 5 is a diagram of an example environment in which systems and/or methods, described herein, may be implemented.

FIG. 5 is a diagram of an example environment 500 in which systems and/or methods, described herein, may be implemented. As shown in FIG. 5, environment 500 may include a user device 510, a platform 520, and a network 530. Devices of environment 500 may interconnect via wired connections, wireless connections, or a combination of wired and wireless connections. In embodiments, any of the functions and operations described with reference to FIGS. 2 through 4 above may be performed by any combination of elements illustrated in FIG. 5.

User device 510 includes one or more devices capable of receiving, generating, storing, processing, and/or providing information associated with platform 520. For example, user device 610 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 610 may receive information from and/or transmit information to platform 520.

Platform 520 includes one or more devices capable of receiving, generating, storing, processing, and/or providing information. In some implementations, platform 520 may include a cloud server or a group of cloud servers. In some implementations, platform 520 may be designed to be modular such that certain software components may be swapped in or out depending on a particular need. As such, platform 520 may be easily and/or quickly reconfigured for different uses.

In some implementations, as shown, platform 520 may be hosted in cloud computing environment 522. Notably, while implementations described herein describe platform 520 as being hosted in cloud computing environment 522, in some implementations, platform 520 may not be cloud-based (i.e., may be implemented outside of a cloud computing environment) or may be partially cloud-based.

Cloud computing environment 522 includes an environment that hosts platform 620. Cloud computing environment 522 may provide computation, software, data access, storage, etc., services that do not require end-user (e.g., user device 510) knowledge of a physical location and configuration of system(s) and/or device(s) that hosts platform 520. As shown, cloud computing environment 522 may include a group of computing resources 524 (referred to collectively as "computing resources 524" and individually as "computing resource 524").

Computing resource 524 includes one or more personal computers, a cluster of computing devices, workstation computers, server devices, or other types of computation and/or communication devices. In some implementations, computing resource 524 may host platform 520. The cloud resources may include compute instances executing in computing resource 524, storage devices provided in computing resource 524, data transfer devices provided by computing resource 524, etc. In some implementations, computing resource 524 may communicate with other computing resources 524 via wired connections, wireless connections, or a combination of wired and wireless connections.

As further shown in FIG. 5, computing resource 524 includes a group of cloud resources, such as one or more applications ("APPs") 524-1, one or more virtual machines ("VMs") 524-2, virtualized storage ("VSs") 524-3, one or more hypervisors ("HYPs") 524-4, or the like.

Application 524-1 includes one or more software applications that may be provided to or accessed by user device 510. Application 524-1 may eliminate a need to install and execute the software applications on user device 510. For example, application 524-1 may include software associated with platform 520 and/or any other software capable of being provided via cloud computing environment 522. In some implementations, one application 524-1 may send/ receive information to/from one or more other applications 524-1, via virtual machine 524-2.

Virtual machine 524-2 includes a software implementation of a machine (e.g., a computer) that executes programs like a physical machine. Virtual machine 524-2 may be either a system virtual machine or a process virtual machine, depending upon use and degree of correspondence to any real machine by virtual machine 524-2. A system virtual machine may provide a complete system platform that supports execution of a complete operating system ("OS"). A process virtual machine may execute a single program, and may support a single process. In some implementations, virtual machine 524-2 may execute on behalf of a user (e.g., user device 510), and may manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 524-4 may provide hardware virtualization techniques that allow multiple operating systems (e.g., "guest operating systems") to execute concurrently on a host computer, such as computing resource 524. Hypervisor 524-4 may present a virtual operating platform to the guest operating systems, and may manage the execution of the guest operating systems. Multiple instances of a variety of operating systems may share virtualized hardware resources.

Network 530 includes one or more wired and/or wireless networks. For example, network 530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
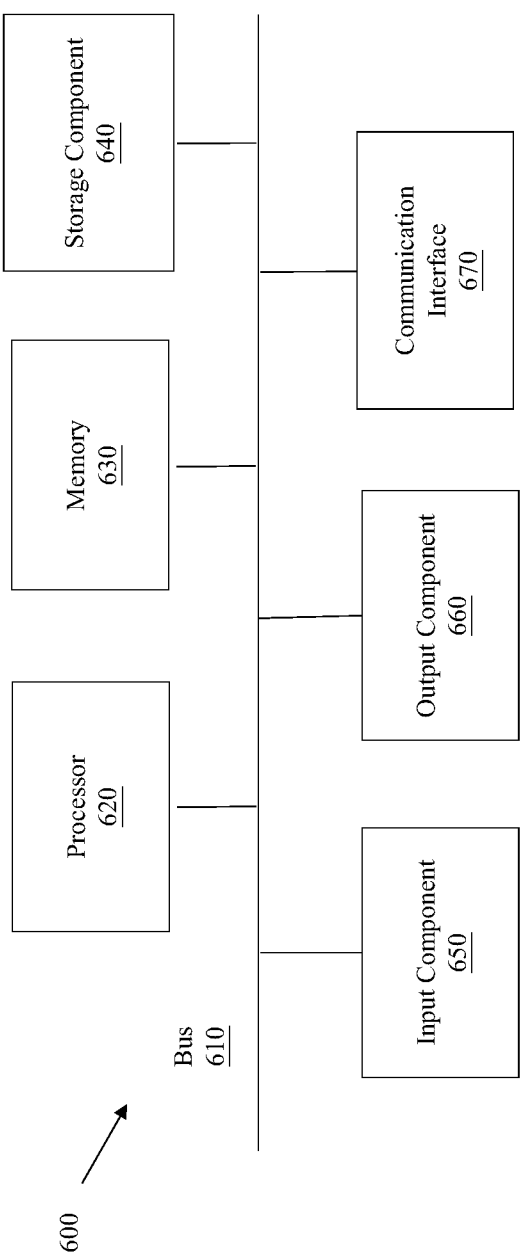
FIG. 6 is a diagram of example components of a device according to an embodiment.

FIG. 6 is a diagram of example components of a device 600. Device 600 may correspond to user device 510 and/or platform 520. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 may be implemented in hardware, firmware, or a combination of hardware and software. Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes in response to processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

In embodiments, any of the operations or processes of FIGS. 2, 3, and 4 may be implemented by or using any one of the elements illustrated in FIGS. 5 and 6. It is understood that other embodiments are not limited thereto, and may be implemented in a variety of different architectures (e.g., bare metal architecture, any cloud-based architecture or deployment architecture such as Kubernetes, Docker, OpenStack, etc.).

According to example embodiments, energy savings is achieved by draining and shutting down O-cloud nodes during idle times. For example, when there are only few Network Functions that are deployed or needed to be deployed on an O-Cloud, the Network Function placement on the O-Cloud is optimized to limited O-Cloud nodes and rest of the O-Cloud nodes are shutdown to save energy consumption in O-Cloud node idle times. The O-Cloud resources may also be drained in order to move Network Functions to other O-Cloud nodes. The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

These computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for shutting down an Open Radio Access Network (O-RAN) Cloud (O-Cloud) node, the method comprising:

receiving, by a Federated O-Cloud Orchestration and Management (FOCOM), a first request to drain an O-Cloud node, the first request being received from a user terminal or from a Non-Real-Time (Non-RT) RAN Intelligent Controller (RIC) based on analysis of O1 data and O2 telemetry data;

transmitting, by the FOCOM to an Infrastructure Management Services (IMS) via an O2 interface, a second request to drain the O-Cloud node based on the received first request;

receiving, by the FOCOM, a third request to shut down the drained O-Cloud node, the third request being received from the user terminal or from the Non-RT RIC;

transmitting, by the FOCOM to the IMS via the O2 interface, a fourth request to shut down the O-Cloud node based on the received third request; and receiving, from the IMS, a notification that the O-Cloud node has been shut down.

2. The method of claim 1, further comprising:

receiving the O1 data and the O2 telemetry data; and determining, based on the received O1 data and the received O2 telemetry data, the O-Cloud node to shut down.

3. The method of claim 2, wherein the determining comprises receiving, by the user terminal, a user input to shut down the O-Cloud based on the received O1 data and the received O2 telemetry data.

4. The method of claim 2, wherein the determining comprises:

analyzing, by the NON-RT RIC, the received O1 data and the received O2 telemetry data; and determining, by the NON-RT RIC, the O-Cloud node to shut down based on the received O1 data and the received O2 telemetry data.

5. The method of claim 1, further comprising:

controlling, by the IMS, to drain the O-Cloud node based on the second request; and

controlling, by the IMS, to shut down the drained O-Cloud node based on the fourth request.

6. The method of claim 5, further comprising:

controlling, by the IMS, to relocate a Network Function deployed on the O-Cloud node to another O-Cloud node.

7. The method of claim 1, further comprising:

receiving, from the IMS by at least one of the FOCOM and the Non-RT RIC, a notification that the O-Cloud node has been drained.

8. The method of claim 1, wherein the first request is to drain the O-Cloud node of any Network Functions deployed on the O-Cloud node.

9. The method of claim 1, wherein the O-Cloud node is a physical node in an O-Cloud.

10. A system for shutting down an Open Radio Access Network (O-RAN) Cloud (O-Cloud) node, the system comprising:

at least one first memory storing first instructions; and at least one first processor implementing a Federated O-Cloud Orchestration and Management (FOCOM), the at least one first processor configured to execute the stored first instructions to:

receive a first request to drain an O-Cloud node, the first request being received from a user terminal or from a Non-Real-Time (Non-RT) RAN Intelligent Controller (RIC) based on analysis of O1 data and O2 telemetry data;

transmit, to an Infrastructure Management Services (IMS) via an O2 interface, a second request to drain the O-Cloud node based on the received first request;

receive a third request to shut down the drained O-Cloud node, the third request being received from the user terminal or from the Non-RT RIC;

transmit, to the IMS via the O2 interface, a fourth request to shut down the O-Cloud node based on the received third request; and receive, from the IMS, a notification that the O-Cloud node has been shut down.

11. The system of claim 10, further comprising:

at least one second memory storing second instructions; and at least one second processor implementing the Non-RT RIC, the at least one second processor configured to execute the second instructions to:

receive the O1 data and the O2 telemetry data;

analyze the received O1 data and the received O2 telemetry data; and determine the O-Cloud node to shut down based on the received O1 data and the received O2 telemetry data.

12. The system of claim 10, wherein the first request is received from the user terminal based on a user input to the user terminal to shut down the O-Cloud node.

13. The system of claim 10, further comprising:

at least one third memory storing third instructions; and at least one third processor implementing the IMS, the at least one third processor configured to execute the third instructions to:

control to drain the O-Cloud node based on the second request; and control to shut down the drained O-Cloud node based on the fourth request.

14. The system of claim 13, wherein the at least one third processor is configured to execute the third instructions to:

control to relocate a Network Function deployed on the O-Cloud node to another O-Cloud node.

15. The system of claim 10, wherein the at least one first processor is configured to execute the first instructions to:

receive, from the IMS, a notification that the O-Cloud node has been drained.

16. At least one non-transitory computer-readable recording medium having recorded thereon instructions executable by at least one processor to perform a method, for shutting down an Open Radio Access Network (O-RAN) Cloud (O-Cloud) node, the method comprising:

receiving, by a FOCOM (Federated O-Cloud Orchestration and Management), a first request to drain an O-Cloud node, the first request being received from a user terminal or from a Non-Real-Time (Non-RT) RAN Intelligent Controller (RIC) based on analysis of O1 data and O2 telemetry data;

transmitting, by the FOCOM to an Infrastructure Management Services (IMS) via an O2 interface, a second request to drain the O-Cloud node based on the received first request;

receiving, by the FOCOM, a third request to shut down the drained O-Cloud node, the third request being received from the user terminal or from the Non-RT RIC;

transmitting, by the FOCOM to the IMS via the O2 interface, a fourth request to shut down the O-Cloud node based on the received third request; and receiving, from the IMS, a notification that the O-Cloud node has been shut down.

17. The at least one non-transitory computer-readable recording medium of claim 16, wherein the method further comprises:

receiving the O1 data and the O2 telemetry data; and determining, based on the received O1 data and the received O2 telemetry data, the O-Cloud node to shut down.

18. The at least one non-transitory computer-readable recording medium of claim 17, wherein the determining comprises receiving, by the user terminal, a user input to shut down the O-Cloud based on the received O1 data and the received O2 telemetry data.

19. The at least one non-transitory computer-readable recording medium of claim 18, wherein the determining comprises:

analyzing, by the NON-RT RIC, the received O1 data and the received O2 telemetry data; and determining, by the NON-RT RIC, the O-Cloud node to shut down based on the received O1 data and the received O2 telemetry data.

20. The at least one non-transitory computer-readable recording medium of claim 17, wherein the method further comprises:

controlling, by the IMS, to drain the O-Cloud node based on the second request; and controlling, by the IMS, to shut down the drained O-Cloud node based on the fourth request.

21. The at least one non-transitory computer-readable recording medium of claim 20, wherein the method further comprises:

controlling, by the IMS, to relocate a Network Function deployed on the O-Cloud node to another O-Cloud node.

22. The at least one non-transitory computer-readable recording medium of claim 21, wherein the method further comprises:

receiving, from the IMS by at least one of the FOCOM and the NRT RIC, a notification that the O-Cloud node has been drained.

* * * * *